United States Patent

Wang

Patent Number: 5,614,156
Date of Patent: Mar. 25, 1997

[54] ULTRA-PYROLYSIS REACTOR FOR HAZARDOUS WASTE DESTRUCTION

[76] Inventor: Chi S. Wang, 5923 Fairmont Dr., Woodridge, Ill. 60517

[21] Appl. No.: 600,820

[22] Filed: Feb. 13, 1996

Related U.S. Application Data

[63] Continuation of Ser. No. 385,632, Feb. 8, 1995, abandoned.

[51] Int. Cl.$^6$ ........................................ F01N 3/10
[52] U.S. Cl. .................. 422/174; 422/170; 422/173; 422/186; 422/189; 422/198; 422/199; 422/179; 422/221; 110/236; 110/250
[58] Field of Search ..................... 422/168, 170, 422/173–175, 199, 190, 186, 181, 198, 189, 240, 179, 241, 242, 221; 110/235, 236, 250, 237, 256, 346; 588/205, 209, 213, 900; 219/407, 408; 373/5, 8, 119, 120, 127, 130

[56] References Cited

U.S. PATENT DOCUMENTS

| | | | |
|---|---|---|---|
| 3,350,495 | 10/1967 | Barnes et al. | 219/408 |
| 3,933,434 | 1/1976 | Matovich | 422/240 |
| 4,147,888 | 4/1979 | Sato | 219/408 |
| 4,646,660 | 3/1987 | Björkman et al. | 110/210 |
| 4,688,495 | 8/1987 | Galloway | 110/250 |
| 4,823,711 | 4/1989 | Kroneberger et al. | 110/236 |
| 4,874,587 | 10/1989 | Galloway | 422/189 |
| 5,052,331 | 10/1991 | Kincaid | 110/235 |

OTHER PUBLICATIONS

Refractory Products—Information about vacuum formed ceramic fiber, no date.
A.P. Green—Information about alunina–silica ceramic fibers, no date.

*Primary Examiner*—Robert J. Warden
*Assistant Examiner*—Hien Tran
*Attorney, Agent, or Firm*—Philip H. Kier

[57] ABSTRACT

A thermoelectric reactor for the chemical destruction of heavy-molecule volatile organic compounds (VOCs), semi-volatile organic compounds, or hydrogen sulfide contained in a gaseous feed. The reactor contains a hollow core containing energy sources. This reactor core surrounded by several ceramic walls and insulating zones. Uniform, high temperatures, up to at least 1900° C., are obtained in the reactor core not only from direct radiant heat from the energy sources, but also from energy reflected and emitted from the surrounding zones. Reaction rates are enhanced by non-equilibrium conditions caused by electromagnetic threes derived from the energy sources. Further chemical destruction is accomplished in a porous energy retaining zone after passage through the reactor core. Ionizing gases and ionization seed material may be added to the gaseous feed material to increase electric conductivity and promote dissociation and ionization in the reactor core.

6 Claims, 2 Drawing Sheets

ULTRA-PYROLYSIS REACTOR FOR HAZARDOUS WASTE DESTRUCTION

CROSS-REFERENCES TO RELATED APPLICATIONS

This is a continuation of patent application Ser. No. 08/385,632 filed Feb. 8, 1995, now abandoned.

BACKGROUND OF THE INVENTION

This invention relates to the thermal destruction of gaseous or vaporized inorganic compounds and organic compounds, such as volatile organic compounds (VOCs) and semi-volatile organic compounds (SVOCs). In particular, it relates to the thermal destruction of heavy-molecule VOCs, such as polychlorinated biphenyls (PCBs), and inorganic compounds, such as hydrogen sulfide ($H_2S$) in a thermoelectric reactor using ultra-pyrolysis technology with thermal radiation enhancement and energy trapping to achieve and maintain temperatures up to and beyond 1900° C., and using non-equilibrium reactions derived from electromagnetic forces to achieve very high destruction efficiencies.

Land disposal of chemically hazardous materials, including volatile and semi-volatile organic compounds, may entail risk of environmental degradation. Consequently, federal statute has severely restricted land disposal of such compounds. Regulations promulgated by the U.S. Environmental Protection Agency under the authority of the Resource Conservation and Recovery Act provide that the treatment standard for certain hazardous organic compounds is technology-based and involves destroying the chemical bonds of the hazardous organic compounds. Organic destruction of heavy-molecule VOCs is frequently accomplished in an incinerator, or other device using open-flame combustion, which may produce noxious byproducts such as dioxin or nitrogen oxides. Other disadvantages of incinerators are that they are difficult to economically scale down in size for small throughputs and that it is becoming more difficult to obtain operating permits for them. There is increasing interest in other thermal technologies that avoid the size limitations and adverse environmental effects of incineration, such as the thermal processor and system taught by Kroneberger and Wilcox in U.S. Pat. No. 4,823,711.

Significant quantities of hydrogen sulfide ($H_2S$) are produced as a waste stream in petroleum refining, natural gas production, and metals refining. The present invention can effectively dissociate hydrogen sulfide to produce salable sulfur and hydrogen, a potentially valuable source of clean energy. The current conventional technology for treatment of hydrogen sulfide is based on the Claus chemistry, which uses mutual reduction/oxidation of between sulfur dioxide and hydrogen sulfide to produce water and elemental sulfur. Thus, one advantage of the present invention over the Claus chemistry is the recovery of hydrogen, rather than water. A comparison of the energy balance of the present invention with that of Claus chemistry shows that the present invention is more energy-efficient and its use could result in a yearly national energy savings of 100–200 trillion Btu. The present invention if used in a closed loop system has the potential to decrease sulfur related emissions compared with conventional hydrogen sulfide technology. Thus, the present invention has the potential benefits of reducing pollution in treating hazardous waste and of producing hydrogen fuel cheaply.

SUMMARY OF THE INVENTION

The present invention is a thermoelectric reactor using ultra-pyrolysis technology with thermal radiation enhancement and energy trapping to sustain a high, relatively uniform temperature in a reactor core, and uses non-equilibrium reactions derived from electromagnetic hydrodynamics to accomplish thermal destruction of chemical bonds. This ultra-pyrolysis thermoelectric reactor may be a component of an integrated system for the decontamination of a broad spectrum of hazardous waste, such as the system described in a pending application Ser. No. 08/385,637 entitled "Multistage Double Closed-Loop Process for Waste Decontamination." and filed by this inventor. It can be sufficiently small that it can be part of a mobile system that can be readily transported to the site of small-volume hazardous waste generators, or it can treat larger throughputs in a larger embodiment.

The ultra-pyrolysis thermoelectric reactor is designed to destroy organic and inorganic compounds contained in a gaseous or vaporized feed stream. The thermal destruction occurs in a reactor core containing a number of energy sources. This reactor core is surrounded by several ceramic walls and insulating zones to minimize the loss of energy from the reactor core and from the reactor itself, such achieving very high energy efficiency. High temperature in the reactor core is obtained not only from direct radiant energy from the energy sources but also from energy reflected and emitted from the surrounding zones. In this way, uniform temperatures are produced that are conducive to uniform reaction products. Electrical circuits for the energy sources in the reactor core are designed to set up electromagnetic fields that create non-equilibrium conditions that enhance reactions rates, and hence a high level of destruction efficiency. After leaving the reactor core, the stream passes through a porous energy retaining zone where further decomposition leading toward complete chemical destruction of the waste occurs.

DESCRIPTION OF THE PREFERRED EMBODIMENT

Figure 1:
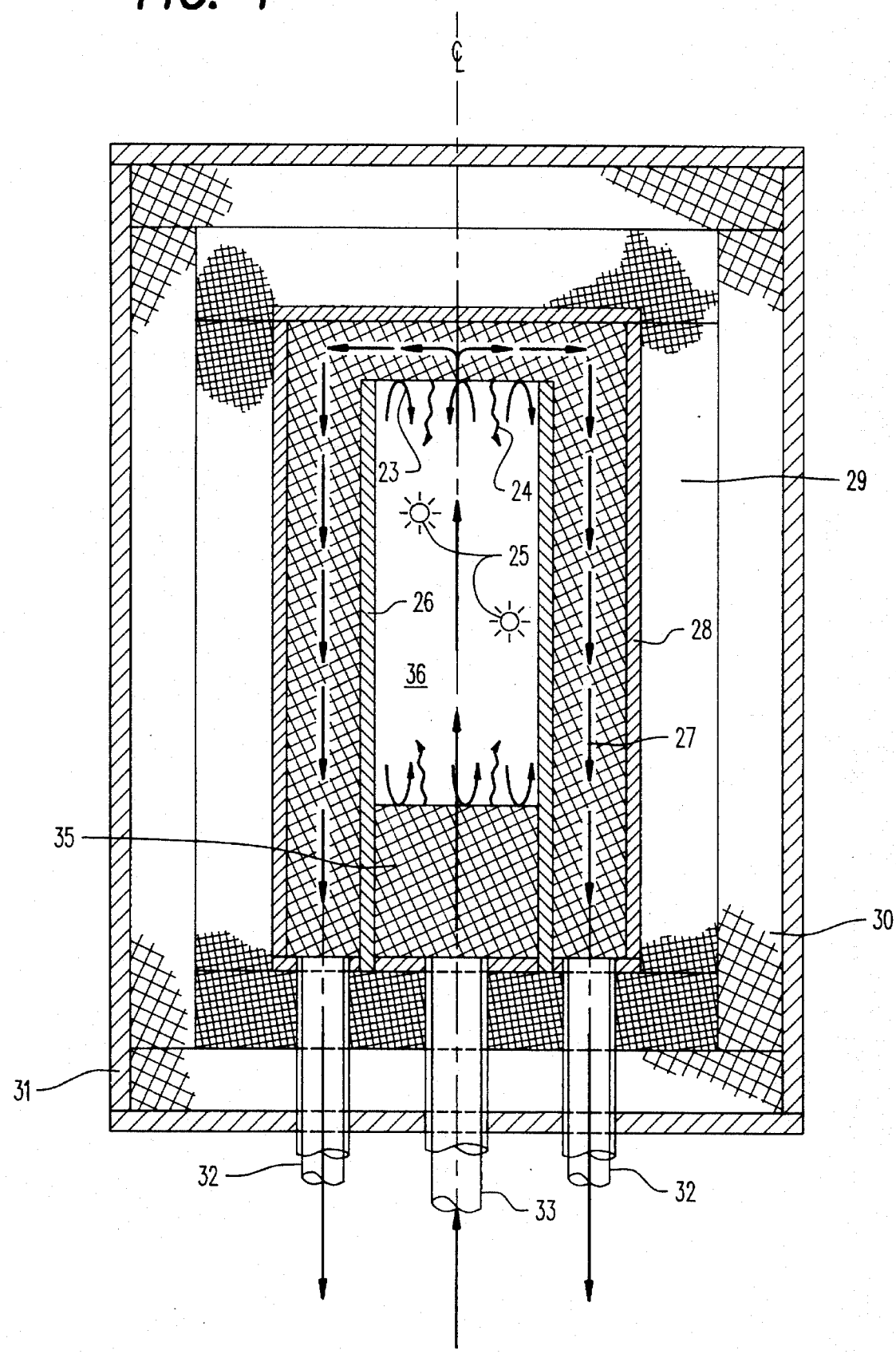
FIG. 1 is a vertical, sectional view of the thermoelectric reactor.
Figure 2:
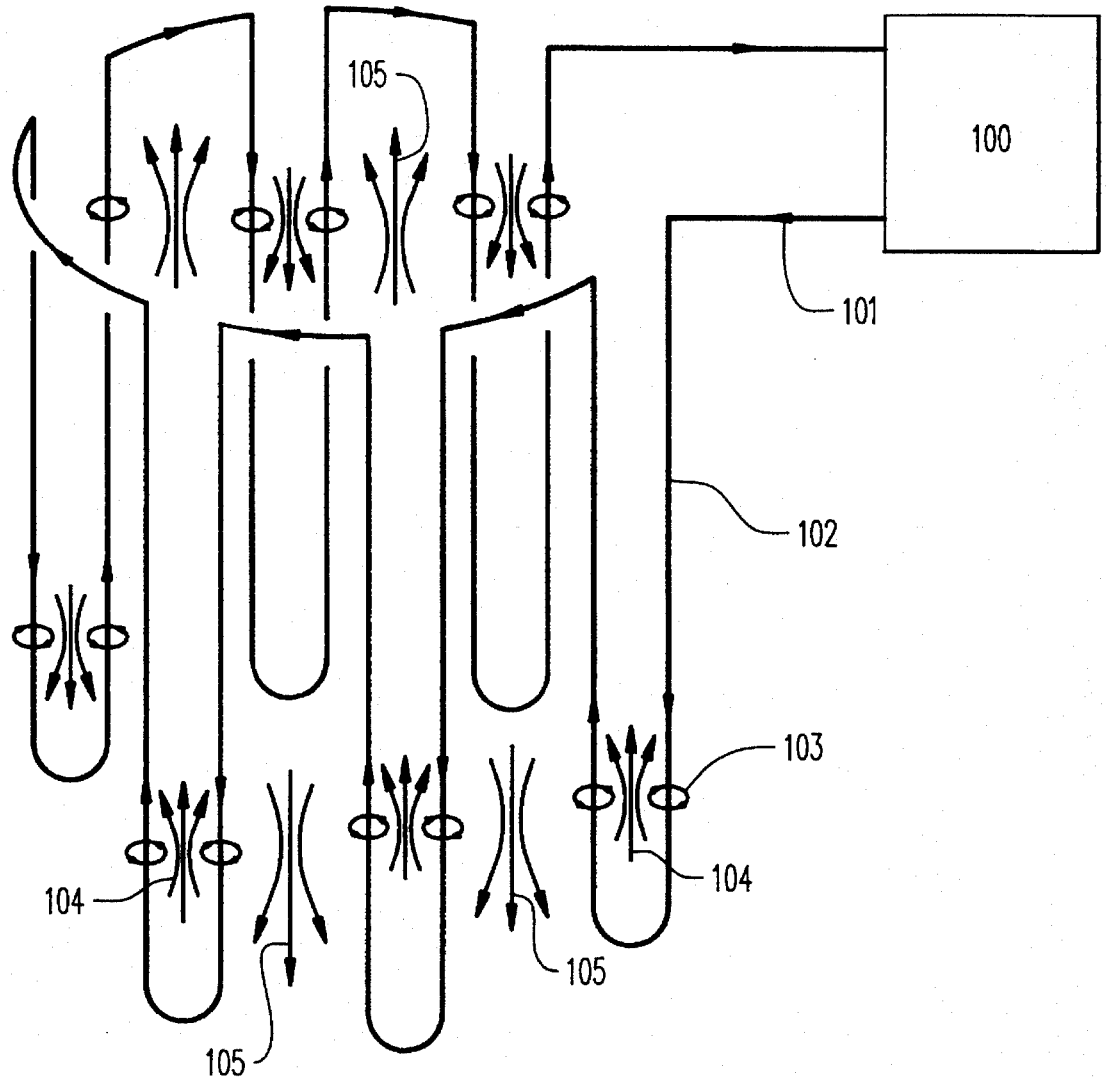
FIG. 2 is a schematic diagram of electric heating elements that may be used as energy sources in the reactor core.

The preferred embodiment of the ultra-pyrolysis thermoelectric reactor is shown in FIG. 1. Proceeding from the outside of the reactor inward there is steel casing 31, insulating high-temperature fiber blankets 30, high temperature vacuum form fibers 29, a ceramic outer wall 28, an energy retaining zone 27, a ceramic inner wall 26, and a reactor chamber. Vacuum form fibers are formed with higher density and a higher percentage of higher/melting/boiling point ceramic materials than fiber blankets. The reactor chamber is preferably cylindrical in shape, but not necessarily with a circular cross section. The reactor chamber contains a turbulent heating zone 35 and a hollow reactor core 36 that contains a plurality of computer-controlled energy sources 25. The high-temperature fiber blankets 30 and vacuum form fibers 29 are typically ceramic fibers, which may be composed of commercially-available alumina, silica, or mullite. These materials have very low thermal conductivities (of the order of 0.04 watts/meter-°C.) and are capable of withstanding high temperature (up to at least 1900° C.). The energy sources 25 within the reactor core, which may be controlled by a computer within the context of a complete processing system, are typically electric resistance heating elements, electric arcs, or plasma torches. FIG. 2 shows a preferred embodiment in which the energy sources are electric resistance heating elements in a vertical annular array. The ceramic walls 26 and 28 may be silicon carbide or graphite. The energy retaining zone 27 and turbulent heating zone 35 contain layers of heat-retaining articulated porous ceramic fibers, such as alumina, silica, mullite, titanate, spinel, zirconia, or some combination thereof. The physical properties of these ceramic fibers (such as thermal emissivity, absorptivity, reflectivity, conductivity, porosity) have some impact on energy efficiency and may increase or decrease energy efficiency by as much as approximately 10 percent. The choice of ceramic fibers can be optimized for specific hazardous waste constituents by consideration the conductive, convective, and radiative heat transfer in a porous medium reactive flow for different types of ceramic fibers.

A gaseous or vaporized feed stream enters the reactor chamber by means of double-wall inlet tubes 33 that penetrate the bottom of the reactor's steel casing 31, insulating high-temperature fiber blankets 30, high-temperature vacuum form fibers 29, and ceramic inner wall 26. The feed stream enters the turbulent heating zone where it is subject to turbulent mixing and is rapidly heated by conduction, convection, and radiation. Within the reactor core 36, the gaseous stream is heated further by radiation to temperatures up to at least 1900 degrees centigrade to destroy the chemical bonds of heavy-molecule VOCs, SVOCs, or some inorganic compounds such as hydrogen sulfide. The reactor core is heated not only by direct radiant energy from the energy sources 25 contained within, but also from radiant energy reflected 23 from the turbulent heating zone below and a part of the energy retaining zone above, and from energy absorbed convectively and emitted back 24 by the turbulent heating zone and the energy retaining zone. These "thermal radiation enhancing" and "energy trapping" characteristics of the present invention, which allow high, uniform temperatures leading to uniform reaction products, are attributable to the energy sources being in the interior of the reactor core, rather than within casing in the walls of reactor core, or external to the reactor core, and to the layers of insulating material that surround the reactor core. The present invention achieves very high energy efficiency, maintaining high temperatures in the reactor core 36 and energy retaining zone 27 because most energy is trapped in the reactor core; most flow energy leaving the reactor core is retained in the energy retaining zone; the energy loss from the reactor core (the highest temperature area) through the ceramic inner wall 26 to the energy retaining zone 27 is retained and utilized there; and the energy loss from the energy retaining zone through the ceramic outer wall 28, ceramic vacuum form fiber 29, ceramic fiber blanket 30, and steel case 31 to the atmosphere is minimal because of multiple insulation zones with very low thermal conductivity materials.

Although FIG. 1 shows a feed stream entering the reactor chamber from the bottom, the orientation of the reactor chamber is not important. The feed stream could just as well enter the reactor from its top, or the reactor could be oriented on a side so that there would be horizontal flow through the reactor chamber.

In the present invention, the heating means are in contact with the material being decomposed, or with decomposition products, as they flow pass in the reactor core. One consequence of this is that the heating means should be made of materials that are corrosion-resistant, as well as capable of withstanding high temperatures, because the stream passing through the reactor may contain corrosive materials, such a hydrogen sulfide. Several ceramic materials and combinations of ceramic and metal material that can withstand high temperature environments and corrosive waste streams may be used for the heating means. Appropriate ceramic materials include zirconium oxide, molybdenum disillicide, silicon carbide, cerium dioxide, lanthanum chromite. Appropriate ceramic and metal materials include a combination of zirconium oxide and inconel. This physical contact between the heating means and the waste stream has the advantage of allowing the formation of a plasma near the surface of the heating surfaces because of the high temperature of the heating surface, above 1900° C. Such plasma enhances the speed with which chemical bonds of the hazardous wastes are destroyed and also enhances dissociation of the process products.

The present invention includes generation of electromagnetic forces that promote dissociation, ionization for plasma formation, or both. FIG. 2 illustrates a preferred embodiment of the heating means that creates two types of electromagnetic fields. In this embodiment, the heating means are electric heating elements 102 with two legs that are vertical. The heating elements are connected to a power source 100 in series and collectively form an annular array that is disposed in the reactor core 36. There are a plurality of such annular electric heating elements disposed in the reactor core. Electric current 101 flows from the power source through the array of heating elements and back to the power source. This arrangement results in the creation of two types of magnetic force 104 and 105 after electric current is applied. One type of magnetic force 104 is induced by induction magnetic field 103 in the space between two legs of a heating element and is directed inward toward the center of the annular array in a horizontal plane. The second type of magnetic force 105 is directed outward horizontally from the center of the annular array. These magnetic forces create non-equilibrium conditions for plasma-chemistry reactions that are very fast in the direction of dissociation. The magnetic fields also expel the dissociated gases or particles away from the reaction areas. The dissociated gases or ionized particles are grouped by the electromagnetic fields according to their masses, which separates the dissociated gases and avoids their recombination at the reaction sites. The dissociated gases being carried away rapidly from the reaction site leads to non-equilibrium conditions and drives the equilibrium-limited reactions to very high conversion rates. Therefore, the efficiency with which hazardous compounds are destroyed or dissociated is enhanced by these electromagnetic hydrodynamic flow.

The vaporized feed stream that enters may be mixed with an ionizing gas, such as argon or helium, and with ionization-promoting seed materials such as potassium, potassium carbonate, or potassium sulfate. If the composition of the feed stream would not otherwise dissociate or ionize at its energy transition state in the environment of the reactor core for effective destruction, the addition of ionizing gases or seed materials would increase electric conductivity of the gases in the reactor core and help initiate plasma reactions.

After leaving the reactor core, the product stream passes through the energy retaining zone 27, where further thermal destruction continues to occur, and exits the reactor through double-walled outlet tubes 32. The destruction in the energy retaining zone helps to complete the destruction of hazardous compounds in the waste stream. The inlet tubes 33 and outlet tubes 32 have double walls to prevent leaks. These double-walled walls have an inner wall of a ceramic material that can withstand high temperatures and contact with a potentially corrosive feed, or product stream, and an outer wall of stainless steel that can withstand high temperatures.

The embodiment described above has been fabricated. When integrated with other off-gas treatment components, a series of laboratory tests using a wide variety of principal hazardous organic constituents (PHOCs) were performed. Excellent results were obtained; the destruction and removal efficiencies from the tests are summarized below. These destruction and removal efficiencies exceed performance standards (99.99%) for incinerators promulgated by the U.S. Environmental Protection Agency in the Code of Federal Regulations (see 40 CFR 264.343(a)(1), Jul. 1, 1993 edition).

wall and the central reaction zone and turbulent heating zone;

a second ceramic wall laterally surrounding and defining the energy retaining zone;

low thermal conductive material arrayed laterally around and surrounding the second impervious wall and the energy retaining zone;

means for continuously introducing gaseous material in a flow into the turbulent heating zone and then sequentially into the central reaction zone and the energy retaining zone, thermal destruction of chemical compounds and formation of reaction products occurring in the central reaction zone and the energy retaining zone;

means for removing reaction products from an end of the energy retaining zone.

| PHOC | Reactor Temp, °C. | Feed (ppb)* | Exhaust (ppb) | Detection Limit, ppb | Destruction & Removal[+] Efficiency % |
|---|---|---|---|---|---|
| Benzene | 1200 | 32,119 | <0.10 (ND)** | 0.10 | >99.99969 |
| Carbon Tetrachloride | 1200 | 57,917 | 0.23 | 0.10 | 99.99969 |
| Chlorobenezene | 1200 | 40,378 | <0.10 (ND) | 0.10 | >99.99975 |
| Chloroform | 1200 | 54,080 | 0.25 | 0.10 | 99.99954 |
| Dichlorethylene | 1200 | 48,782 | <0.5 (ND) | 0.50 | >99.99898 |
| Hexachlorobenzene | 1400 | 121,803 | <5.0 (ND) | 5.00 | >99.99590 |
| Tetrachlorethylene | 1200 | 59,379 | <0.10 (ND) | 0.10 | >99.99983 |
| Toluene | 1200 | 31,644 | <0.10 (ND) | 0.10 | >99.99968 |
| Trichloroethylene | 1200 | 53,350 | <0.10 (ND) | 0.10 | >99.99981 |
| Xylene | 1200 | 31,465 | <0.10 (ND) | 0.10 | >99.99968 |

[+]For those compounds not detected in the exhaust, the detection limit was used as exhaust concentration for the calculation of destruction and removal efficiency.
*ppb means parts per billion
**ND means not detected

I claim:

1. A reactor for the thermal decomposition of chemical compounds in a gaseous form comprising:

a turbulent heating zone containing porous articulated material, the turbulent heating zone mixing and preheating gaseous material introduced into the reactor;

a hollow central reaction zone downstream from and adjacent to the turbulent heating zone in which the thermal decomposition occurs creating reaction products;

a plurality of electric resistance heating elements containing electric currents arrayed within the interior of the hollow central reaction zone, each electric resistance heating element being annular, having vertical legs with a top and a bottom, attached in series alternately at the top and at the bottom, the electric resistance heating elements being in contact with the gaseous material flowing through the central reaction zone, the heating elements directly heating the gaseous material, setting up electromagnetic fields within the central reaction zone, and causing plasma formation, non-equilibrium plasma chemistry reaction, and separation of reaction products from reaction zone;

a first impervious ceramic wall laterally defining the central reaction zone and the turbulent heating zone;

an energy retaining zone containing porous articulated material arrayed downstream from the central reaction zone and laterally around the first impervious ceramic 2. A reactor for the thermal decomposition of chemical compounds in a gaseous form as set forth in claim 1 wherein the energy retaining zone and the turbulent heating zone contain porous ceramic layers.

3. A reactor for the thermal decomposition of chemical compounds in a gaseous form as set forth in claim 2 wherein the electric resistance heating elements are made of ceramic materials or combinations of ceramic and metal materials.

4. A reactor for the thermal decomposition of chemical compounds in a gaseous form as set forth in claim 3 wherein the means for continuously introducing gaseous material and the means for removing reaction products include double-walled tubes with a ceramic inner wall and a stainless steel outer wall.

5. A reactor for the thermal decomposition of chemical compounds in a gaseous form as set forth in claim 4 wherein the low thermal conductive material are vacuum form fibers and fiber blankets, the vacuum form fibers being arrayed interior to the fiber blankets, and the vacuum form fibers having a greater density and a higher percentage of higher melting point material than the fiber blankets.

6. A reactor for the thermal decomposition of chemical compounds in a gaseous form as set forth in claim 5 wherein the means for continuously introducing gaseous material into the turbulent heating zone is constructed and arranged to introduce ionizing gases and ionization seed material into the turbulent heating zone.

* * * * *